US011323564B2

(12) United States Patent
Dwane et al.

(10) Patent No.: US 11,323,564 B2
(45) Date of Patent: May 3, 2022

(54) CASE MANAGEMENT VIRTUAL ASSISTANT TO ENABLE PREDICTIVE OUTPUTS

(71) Applicant: Dell Products L.P., Round Rock, TX (US)

(72) Inventors: Patrick Dwane, Mitchelstown (IE); Henrique C. Wisnieski, Eldorado do Sul (BR)

(73) Assignee: Dell Products L.P., Round Rock, TX (US)

( * ) Notice: Subject to any disclaimer, the term of this patent is extended or adjusted under 35 U.S.C. 154(b) by 1115 days.

(21) Appl. No.: 15/862,243

(22) Filed: Jan. 4, 2018

(65) Prior Publication Data

US 2019/0208056 A1 Jul. 4, 2019

(51) Int. Cl.
H04M 3/50 (2006.01)
H04M 3/22 (2006.01)
G06K 9/62 (2022.01)
G06N 20/00 (2019.01)

(52) U.S. Cl.
CPC ............ H04M 3/50 (2013.01); G06K 9/6256 (2013.01); G06K 9/6262 (2013.01); G06N 20/00 (2019.01); H04M 3/22 (2013.01); H04M 2203/403 (2013.01)

(58) Field of Classification Search
None
See application file for complete search history.

(56) References Cited

U.S. PATENT DOCUMENTS

| 10,440,180 | B1* | 10/2019 | Jayapalan | G06N 20/00 |
| 10,750,024 | B2* | 8/2020 | Chishti | H04M 3/5183 |
| 2011/0158398 | A1* | 6/2011 | Kannan | H04M 3/5191 |
| | | | | 379/265.09 |
| 2013/0036062 | A1* | 2/2013 | Natarajan | G06Q 10/00 |
| | | | | 705/304 |
| 2016/0358115 | A1* | 12/2016 | Gustafson | G06Q 10/06395 |
| 2017/0308595 | A1* | 10/2017 | Dey | G06F 16/24575 |
| 2017/0316438 | A1* | 11/2017 | Konig | G06Q 30/016 |
| 2018/0034842 | A1* | 2/2018 | Smyth | G06N 20/00 |

OTHER PUBLICATIONS

Charu Jangid et al., CustoVal: Estimating Customer Lifetime Value Using Machine Learning Techniques, Dept. of CIS—Senior Design 2013-2014, http://www.seas.upenn.edu/~cse400/CSE400_2013_2014/reports/13_report.pdf.

(Continued)

*Primary Examiner* — Quoc D Tran
(74) *Attorney, Agent, or Firm* — Terrile, Cannatti & Chambers; Stephen A. Terrile

(57) ABSTRACT

A system, method, and computer-readable medium for performing a customer service interaction estimation operation, comprising: training a customer service interaction estimation system using a training dataset of cases to provide a trained predictive model; identifying current open cases via the customer service interaction system; applying the trained predictive model to the current open cases to identify low customer experience cases; generating an estimation output relating to the current open cases, the estimation output identifying an open case subset of cases having a high risk of high effort to resolve.

20 Claims, 11 Drawing Sheets

(56) References Cited

OTHER PUBLICATIONS

Jason Raats et al., Predicting customer loyalty, https://repository.tudelft.nl/islandora/object/uuid:6702aba7-17b5-43d4-938d-a35f53890342/datastream/OBJ, Dec. 2, 2015.

Alex Marandon, Data Science Central, Using Machine Learning to Predict Customer Behaviour, http://www.datasciencecentral.com/profiles/blogs/using-machine-learning-to-predict-customer-behaviour, posted Apr. 10, 2016.

Jason Brownlee, Implementation Patterns for the Encoder-Decoder RNN Architecture with Attention, Machine Learning Mastery, Long-term Memory Networks, Oct. 19, 2017, http://machinelearningmastery.com/tactics-to-combat-imbalanced-classes-in-your-machine-learning-dataset/Implementation.

\* cited by examiner

```
Total number of records: 6825
Customer effort scores in the acceptable range: 6538
Customer effort scores in the desired range: 287
Percentage of Customer effort scores in the desired range: 4.21%
```

*Figure 6A*

```
Unpopulated Cells in SR column: 0.00%
Unpopulated Cells in InboundContacts column: 19.61%
Unpopulated Cells in OrderValueUSD column: 0.03%
```

*Figure 6B*

```
# Load the cleansed dataset
data = pd.read_csv("stellaratingdata_2.csv")

# Success - Display the first record
display(data.head(n=1))
```

Total number of records: 2636
Customer effort scores in the acceptable range: 2484
Customer effort scores in the desired range: 152
Percentage of Customer effort scores in the desired range: 5.77%

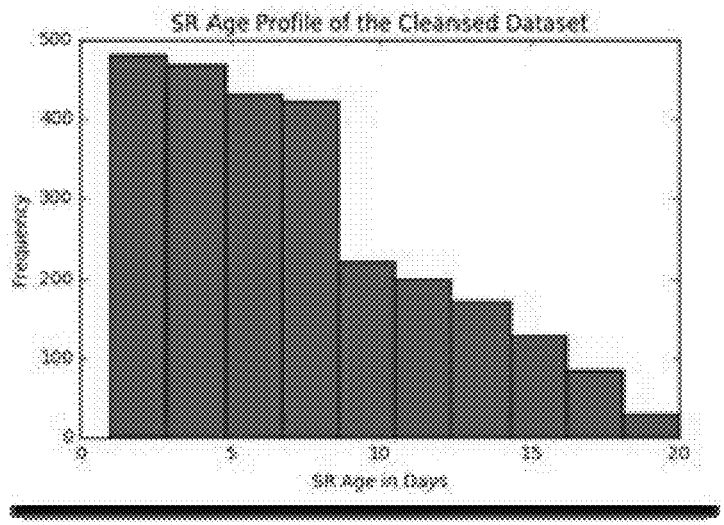

*Figure 9*

```
# Import the three supervised learning models from sklearn
from sklearn.linear_model import LogisticRegression
from sklearn.tree import DecisionTreeClassifier
from sklearn.ensemble import RandomForestClassifier

# Initialize the three models
clf_A = LogisticRegression(random_state = 42)
clf_B = RandomForestClassifier(random_state = {2)
clf_C = DecisionTreeClassifier(random_state = 42, min_samples_leaf=10)

# Calculate the number of samples for 1%, 10%, and 100% of the training data
samples_1 = int(len(X_train) * 0.01)
samples_10 = int(len(X_train) * 0.1)
samples_100 = int(len(X_train))

# Collect results on the learners
results = {}
for clf in [clf_A, clf_B, clf_C]:
    clf_name = clf.__class__.__name__
    results[clf_name] = {}
    for i, samples in enumerate([samples_1, samples_10, samples_100]):
        results[clf_name][i] = \
        train_predict(clf, samples, X_train, y_train, X_test, y_test)

# Run metrics visualization for the three supervised learning models chosen
vs.evaluate(results, accuracy, fscore)
```

*Figure 10*

|  | Naïve Predictor | Decision Tree | Logistic Regression | Random Forrest |
|---|---|---|---|---|
| FScore | 0.95 | 0.9387 | 0.9415 | 0.9367 |
| Cohen Kappa | N/A | 0.397 | 0.0 | -0.0309 |

*Figure 12*

|  | Decision Tree | Logistic Regression | Random Forrest |
|---|---|---|---|
| FScore | 0.951 | 0.640 | 0.996 |
| Accuracy | 0.891 | 0.616 | 0.991 |

*Figure 14*

CASE MANAGEMENT VIRTUAL ASSISTANT TO ENABLE PREDICTIVE OUTPUTS

BACKGROUND OF THE INVENTION

Field of the Invention

The present invention relates to information handling systems. More specifically, embodiments of the invention relate to case management virtual assistant to enable predictive outputs.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

It is known to use information handling systems to respond to customer requests for assistance. A Customer's request for assistance to help them clarify or solve their business need can take many forms such as "appointments," "tickets," "calls," "emails," etc. These requests for assistance are often referred to as cases. It is known to user Customer Relationship Management (CRM) systems to manage and monitor customer requests for assistance throughout the lifecycle of the case. Case managers are a customer's point of contact within the business to resolve the case.

SUMMARY OF THE INVENTION

A system, method, and computer-readable medium for performing a customer service interaction estimation operation. In certain embodiments, the customer service interaction estimation operation implements machine learning operations to estimate potential high effort customer service interactions. In certain embodiments, the potential high effort customer service interactions are identified from a live pool of active customer service cases. Identifying the potential high effort customer service interactions enables the customer service interaction estimation operation to isolate the potential high effort customer service interactions for appropriate corrective actions thus addressing potential high effort hotspots.

More specifically, in certain embodiments, the invention relates to performing a customer service interaction estimation operation, comprising: training a customer service interaction estimation system using a training dataset of cases to provide a trained predictive model; identifying current open cases via the customer service interaction system; applying the trained predictive model to the current open cases to identify low customer experience (CE) cases (i.e., cases having an associated high effort to resolve); and, generating an estimation output relating to the current open cases, the estimation output identifying an open case subset of cases having a high risk of high effort to resolve.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIG. 6A shows an example of a data imbalance within a sample initial data set.

FIG. 6B shows an example of data anomalies within a sample initial data set.

FIG. 9 shows a chart of the distribution of service request age within the dataset.

FIG. 10 shows example code for performing supervised learning models.

FIG. 12 shows example results for the decision tree supervised learning operation, the logistic regression supervised learning operation and the random forest supervised learning operation.

FIG. 14 shows example results for the decision tree supervised learning operation, the logistic regression supervised learning operation and the random forest supervised learning operation for an oversampled dataset.

DETAILED DESCRIPTION

Various aspects of the present disclosure include an appreciation that customer "Satisfaction" or "Effort" ratings are often used to measure the customer's perception of the quality of a case resolution. Various aspect of the disclosure include an appreciation that tools used to assess customer satisfaction performance often fail to identify customer dissatisfaction. Factors that can contribute to this failure can include a fixed set of process measurements, specific by business type, requiring a subject matter expertise to operationalize, an inability to systematically quantify the impact human behavioral characteristics together with resolution process characteristics, etc. As such, effective, real time, predictive mechanisms to measure customer satisfaction are often limited or not present.

Various aspects of the disclosure include an appreciation that companies can create loyal customers by helping them solve their problems. However, according to various information, customer service or support interactions can be nearly four times more likely to lead to disloyalty than loyalty. Instead of struggling to delight customers, companies often focus on the creation of low-effort service experiences that help their customers solve problems quickly and easily. However, such a strategy can be difficult to operationalize; if it fails, companies risk missing the opportunity to deliver a proportionate increase in loyalty.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
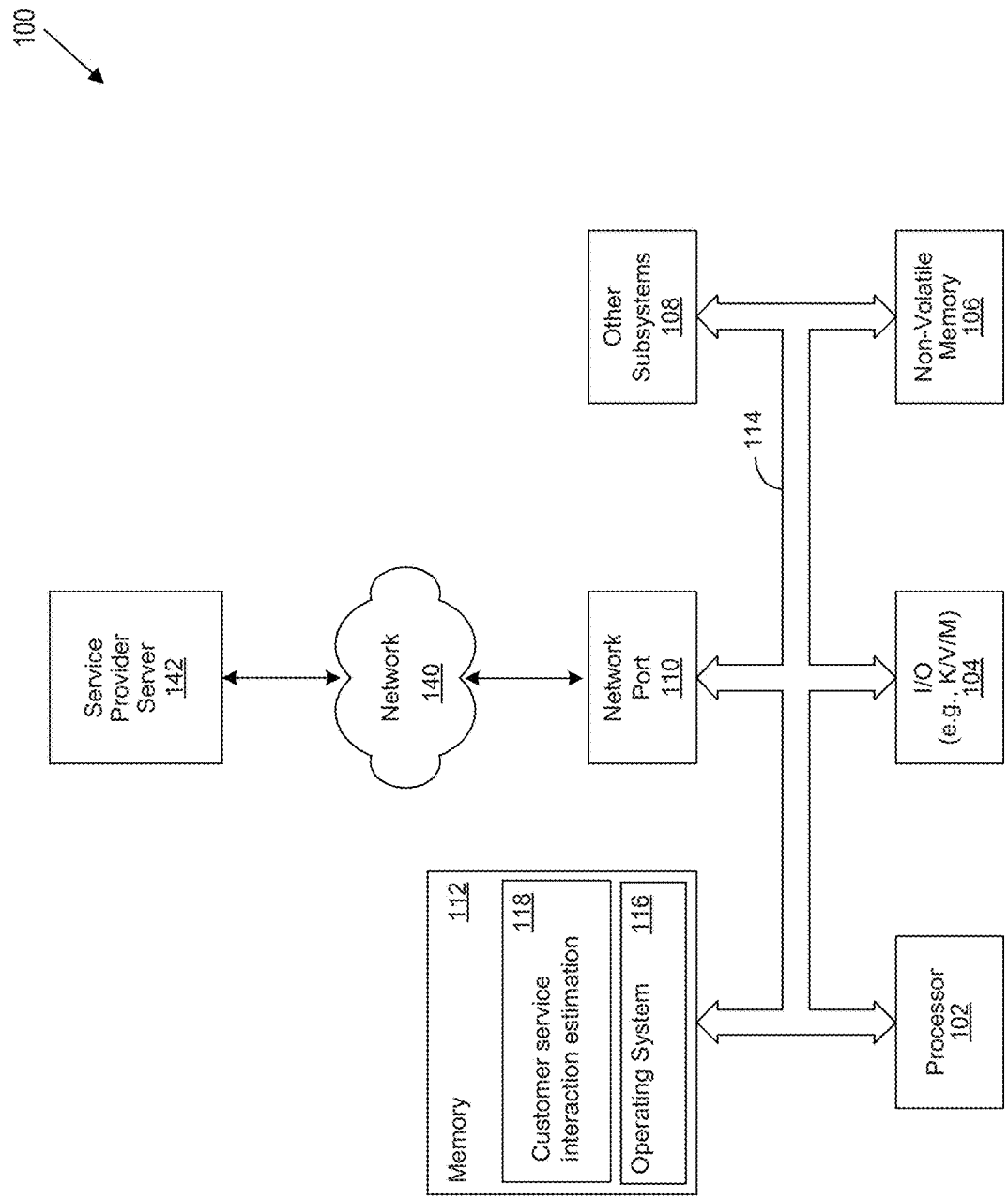
FIG. 1 shows a general illustration of components of an information handling system as implemented in the system and method of the present invention.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116 and in various embodiments may also comprise a customer service interaction estimation system 118.

The customer service interaction estimation system performs a customer service interaction estimation operation. In certain embodiments, the customer service interaction estimation operation implements machine learning operations to estimate potential high effort customer service interactions. In certain embodiments, the potential high effort customer service interactions are identified from a live pool of active customer service cases. Identifying the potential high effort customer service interactions enables the customer service interaction estimation operation to isolate the potential high effort customer service interactions for appropriate corrective actions thus addressing potential high effort hotspots.

The customer service interaction estimation system 118 performs a customer service interaction estimation operation. The customer service interaction estimation operation improves processor efficiency (and thus the efficiency of the information handling system 100) by automatically estimating potential high effort customer service interactions. As will be appreciated, once the information handling system 100 is configured to perform the customer service interaction estimation operation, the information handling system 100 becomes a specialized computing device specifically configured to perform the customer service interaction estimation operation and is not a general purpose computing device. Moreover, the implementation of the customer service interaction estimation operation on the information handling system 100 improves the functionality of the information handling system and provides a useful and concrete result of automatically estimating potential high effort customer service interactions.

Figure 2:
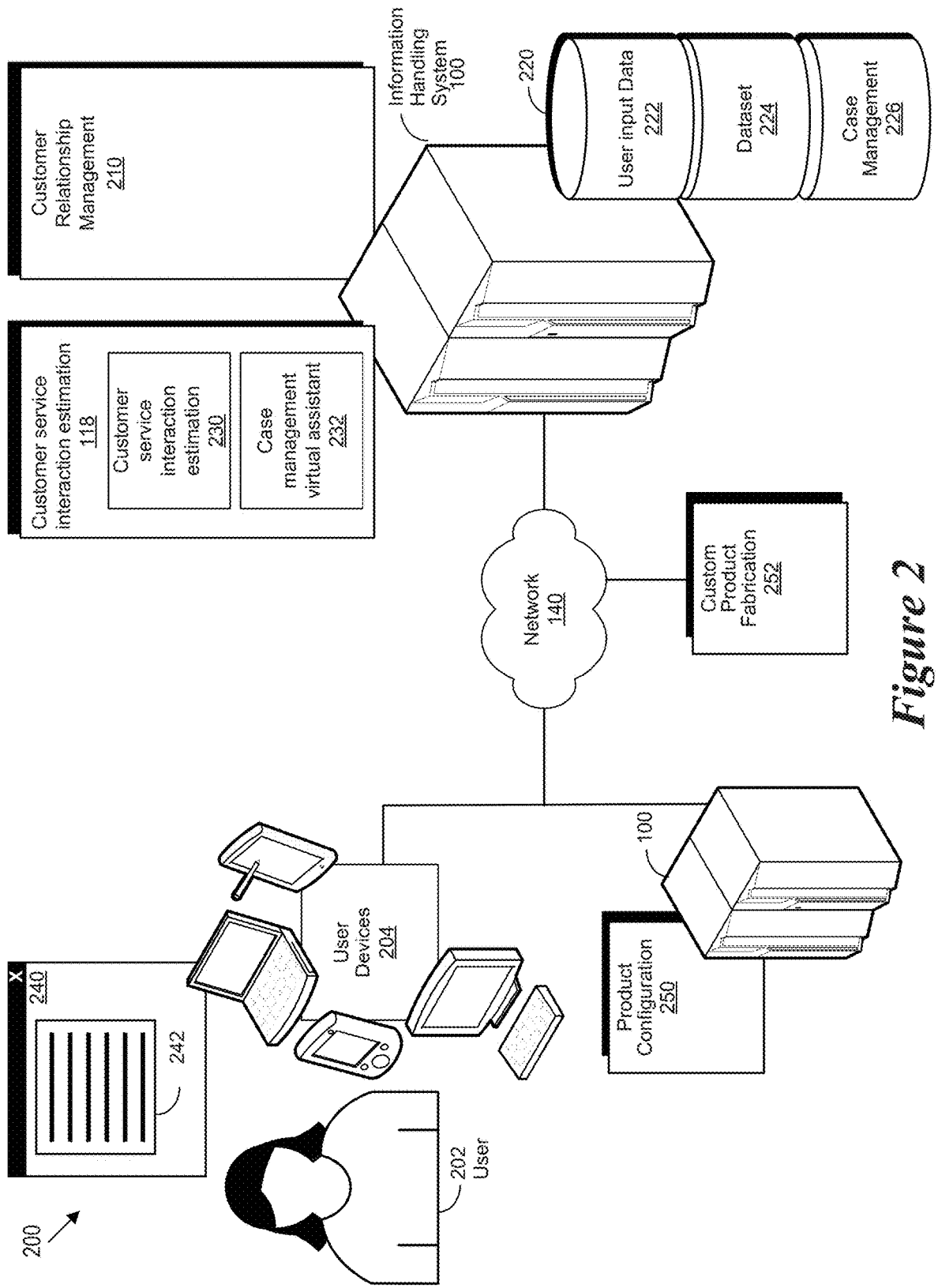
FIG. 2 shows a block diagram of a customer service interaction estimation environment.

FIG. 2 is a block diagram of a customer service interaction estimation environment 200 implemented in accordance with an embodiment of the invention. The customer service interaction estimation environment includes a customer service interaction estimation system 118 as well as a customer relationship management (CRM) system 210.

In various embodiments, a user 202 generates an estimation user query which is provided to the customer service interaction estimation system 118. In various embodiments, a customer service interaction estimation system 118 executes on a hardware processor of an information handling system 100. In various embodiments, the user 202 may use a user device 204 to interact with the customer service interaction estimation system 118.

As used herein, a user device 204 refers to an information handling system such as a personal computer, a laptop computer, a tablet computer, a personal digital assistant (PDA), a smart phone, a mobile telephone, or other device that is capable of communicating and processing data. In various embodiments, the user device is configured to present an estimation user interface 240. In various embodiments, the estimation user interface 240 presents a graphical representation 242 of customer service interaction estimations which are automatically generated in response to a user interaction. In various embodiments, the user device 204 is used to exchange information between the user 202 and the customer service interaction estimation system 118 through the use of a network 140. In certain embodiments, the network 140 may be a public network, such as the Internet, a physical private network, a wireless network, a virtual private network (VPN), or any combination thereof. Skilled practitioners of the art will recognize that many such embodiments are possible and the foregoing is not intended to limit the spirit, scope or intent of the invention.

In various embodiments, the customer service interaction estimation system 118 includes a customer service interaction estimation module 230 which performs a customer service interaction estimation operation. In various embodiments, the customer service interaction estimation system 118 includes a case management virtual assistant 232.

In various embodiments, the customer service interaction estimation includes a storage repository 220. The storage repository may be local to the system executing the customer service interaction estimation system 118 or may be executed remotely. In various embodiments, the storage repository includes one or more of a user input data repository 222, a dataset repository 224 and a case management repository 226.

In various embodiments, the customer service interaction estimation system 118 interacts with the CRM system 210 which may be executing on a separate information handling system. In various embodiments, the customer service interaction estimation system 118 interacts with a product configuration system 250 which may be executing on a separate information handling system 100. In various embodiments, the product configuration system 250 interacts with a custom product fabrication system 252. In various embodiments, the custom product fabrication system 252 fabricates products to include components identified using the customer service interaction estimation system 118. In various embodiments, the customer service interaction estimation user interface 240 may be presented via a website. In various embodiments, the website is provided by one or more of the customer service interaction estimation system 118 and the product configuration system 250.

For the purposes of this disclosure a website may be defined as a collection of related web pages which are identified with a common domain name and is published on at least one web server. A website may be accessible via a public internet protocol (IP) network or a private local network. A web page is a document which is accessible via a browser which displays the web page via a display device of an information handling system. In various embodiments, the web page also includes the file which causes the document to be presented via the browser. In various embodiments, the web page may comprise a static web page which is delivered exactly as stored and a dynamic web page which is generated by a web application that is driven by software that enhances the web page via user input to a web server.

Figure 3:
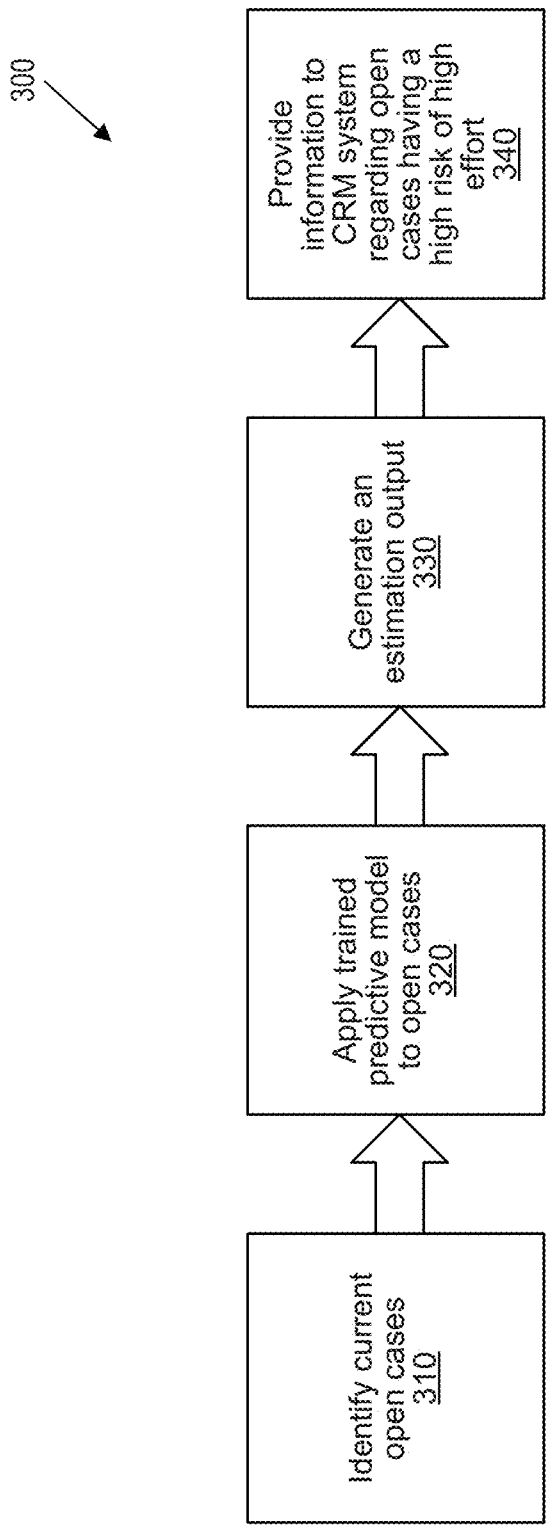
FIG. 3 shows a flow chart of a customer service interaction estimation operation.

Referring to FIG. 3, a flow chart of a customer service interaction estimation is shown. It has been discovered that there are certain strategic levers available to companies to design low effort experiences. However, it may not be practical or cost effective to deploy all of these strategic levers into an operations environment. The customer service interaction estimation operation enables a determination of when to deploy strategic levers for certain cases.

More specifically, the customer service interaction estimation operation begins at step 310 by identifying all current open cases (i.e., all cases which have at least one action outstanding). Next, at step 320, the customer service interaction estimation operation applies a trained predictive model analysis to open cases to identify low customer experience (CE) cases (i.e., cases having an associated high effort to resolve, possibly resulting in a poor customer experience). Next at step 330, the customer service interaction estimation operation generates an estimation output. The estimation output is generated by the predictive model to represent an open case subset having a high risk of high effort. High effort cases (resulting in a poor customer experience) are typically detected retrospectively via a transactional survey. For example a low effort/low risk case might have a score of 90% or 9/10. Conversely, a high effort/high risk case might have a score of 30% or 3/10. More specifically, the use of the word "risk" denotes the possibility of a high effort experience and/or negative impact to the operational key performance indicators (KPIs) of a case resolution provider. Next, at step 340, information is provided to the CRM system regarding the open case subset having a high risk of high effort. In certain embodiments, the information can include an alert. In certain embodiments, the information regarding the open case subset having a high risk of high effort is used to preemptively perform corrective actions on the open case subset. In various embodiments, corrective actions could be a line manager intervening proactively to take over the case or switch the agent, to switch the communications channel to a lower effort. In various embodiments, corrective action can include from an overall perspective designing an operation around specific case types.

Various aspects of the present disclosure include an appreciation of the time series nature of the cases and how that influences the overall customer effort, as well as the balanced influence of process and human behavioral attributes on the outcome of a case.

Figure 4:
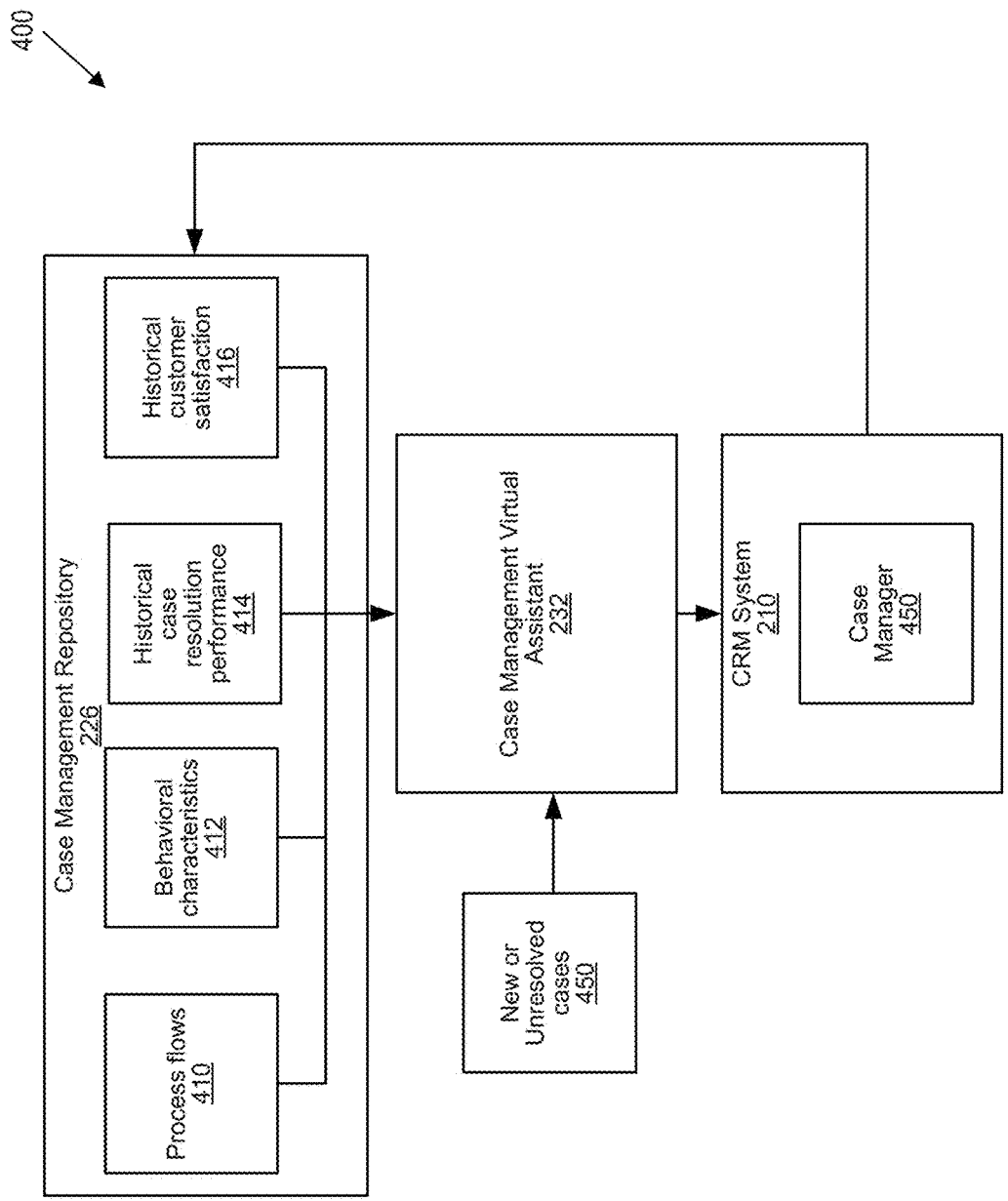
FIG. 4 shows a block diagram representation of a flow of the customer service interaction estimation operation.

Referring to FIG. 4, a block diagram representation of a flow of the customer service interaction estimation operation is shown. More specifically, the case management virtual assistant 232 interacts with the case management repository 226 as well as the CRM system 210. The case management repository 226 includes a repository of process flows 410, a repository of behavioral characteristics 412, a repository of historical case resolution process performance 414 and a repository of historical customer satisfaction or effort performance 416. The repository of process flows 410 stores information regarding customer case management process flow. The repository of behavioral characteristics 412 stores information regarding human behavioral characteristics of case managers such as tenure in role information, language information, communication proficiency scores, etc. The repository of historical case resolution process performance 414 stores information regarding case resolution performance such as time to resolve, number of customer contacts, etc.

The case management repository 226 captures mappings of customer case management process flows, historical case resolution process performance and personalized human behavioral characteristics of the case managers and stores this information to the appropriate repository. The information from the repository of process flows 410, the repository of behavioral characteristics 412, the repository of historical case resolution process performance 414 and the repository of historical customer satisfaction or effort performance 416 is used by the customer service interaction estimation system to generate a customer service interaction baseline.

Figure 5:
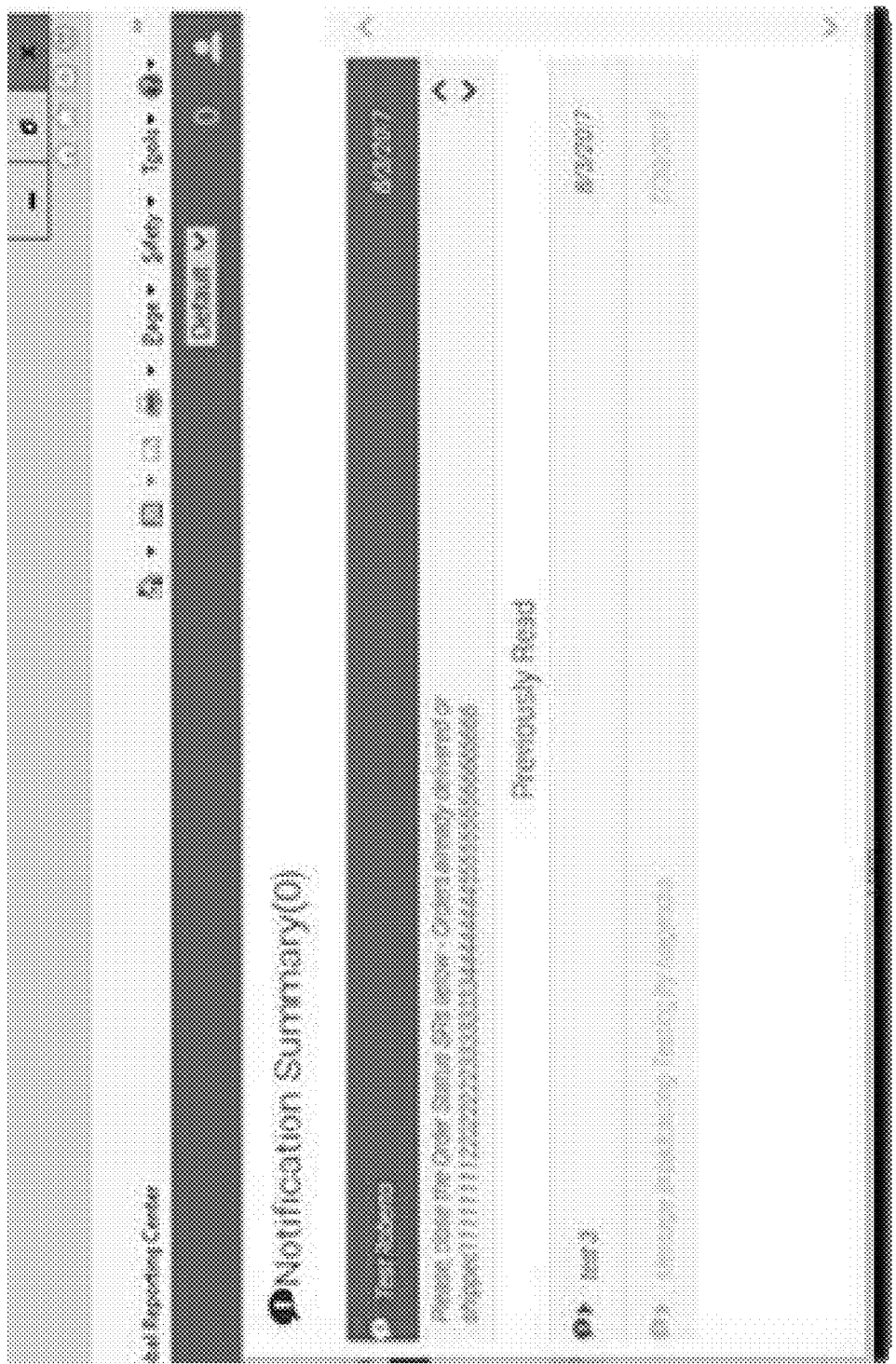
FIG. 5 shows a screen presentation of an example prediction alert.

The case management virtual assistant 232 then uses the customer service interaction baseline to predict customer satisfaction performance of each new or currently unresolved case 450. In certain embodiments, the case management virtual assistant performs a classification operation using the customer service interaction baseline on each new or unresolved case 450. The case management virtual assistant then delivers a prediction to a case manager 460 within the CRM system 210. In certain embodiments, the prediction can include a prediction alert. In certain embodiments, the prediction includes effort data associated with the new or unresolved case. FIG. 5 shows a screen presentation of an example prediction alert.

Various aspects of the present disclosure include an appreciation that the effort data associated with a customer service or support case interactions can include an imbalanced dataset. For the purposes of this disclosure, an imbalanced dataset refers to a dataset having high proportion of data in one class. For example, in a particular dataset of interest, one may have three different labels to be classified (e.g., A, B and C). But the training dataset might have a dataset with 70% volume for the A class label, 25% for the B class label and 5% for the C class label. In this example, the dataset is skewed or biased towards certain classes. From a machine learning perspective, it is desirable to have an accurate, scalable solution to predict high effort hotspots. However, the imbalanced nature of the effort data can require a definition of accurate in the context of the effort data. Certain machine learning accuracy measures can set forth an excellent accuracy (such as 90%), but the accuracy only reflects an underlying class distribution. Accordingly, accuracy is not the metric to use with an imbalanced dataset.

The machine learning operation of the present disclosure relies on a plurality of evaluation metrics when interacting with the effort data. More specifically, the evaluation metrics include an F1 score evaluation metric (also referred to as an F-score), a kappa evaluation metric (also referred to as Cohen's kappa) and a receiver operating curve (ROC) curve evaluation metric. The F1 score evaluation metric provides a weighted average of precision and recall. The kappa evaluation metric provides a classification accuracy normalized by the imbalance of the classes in the data. An ROC curve is a graphical plot that illustrates the diagnostic ability of a binary classifier system as its discrimination threshold is varied. The ROC curve evaluation metric enables accuracy models to be selected based on the balance of sensitivity and specificity thresholds. Sensitivity measures a proportion of positives that are correctly identified as such. Specificity measures a proportion of negatives that are correctly identified as such.

The customer service interaction estimation operation interacts with a plurality of variables from a raw dataset. More specifically, the plurality of variables include a service request identifier variable (SR), a customer effort variable (SetllaRating), a case manager location variable (CaseManagerLocation), a case managers touched variable (CaseManagersTouched), a closed data variable (ClosedDate), a service request age variable (SRAge), an inbound contact variable (InboundContacts), an outbound contacts variable (OutboundContacts), a total contacts variable (TotalContacts), a non-contact activities variable (NonContactActivities), a total activities variable (TotalActivities), a diagnostic tier variable (Diagtier), a last activity variable (DayssinceLastupdate), an order value variable (OrderValueUSD), a language proficiency variable (VersanntScore) and a case manager tenure variable (CaseManagerTenture).

The service request identifier variable (SR) provides a reference identifier for a customer service case. The customer effort variable (SetllaRating) represents a customer effort score. In certain embodiments, the customer service score is based on a numerical rating such as a 1-5 rating. The case manager location variable (CaseManagerLocation) represents a location of a case manager or team of case managers. The case managers touched variable (CaseManagersTouched) indicates whether a case has had one or multiple owners. Intuitively, multiple owners may indicate there is friction associated with the case. The closed date variable (ClosedDate) indicates a date that the case was closed. The service request age variable (SRAge) indicates a current age of the case. The inbound contact variable (InboundContacts) provides a measure of a number of contacts received on a case. The outbound contacts variable (OutboundContacts) provides a measure of a number of contacts sent on a case. The total contacts variable (TotalContacts) provides a sum of the inbound and outbound volumes (i.e., contacts). The non-contact activities variable (NonContactActivities) provides a measure of internal activities to work a case such as reaching out to other departments for information. The total activities variable (TotalActivities) provides information regarding the total activities associated with a case. The diagnostic tier variable (Diagtier) provides information regarding a type of case. In certain embodiments, the type of case may be selected when a case manager is interacting with a customer. The last activity variable (DayssinceLastupdate) provides a measure of the time since the last activity on a case. The order value variable (OrderValueUSD) provides information regarding a value of an order associated with the case. Conceptually, it might be interesting to determine if the order value has an effect on the overall customer experience. The language proficiency variable (VersanntScore) provides an indication of the language proficiency of the case manager currently assigned to a case. The case manager tenure variable (CaseManagerTenture) provides information regarding time in role for the case manager assigned to the case. The time in role information provides an indication of a level of experience of the case manager.

Referring to FIGS. 6A and 6B, when performing the customer service interaction estimation operation, an initial analysis of the dataset from the case management repository is performed. Certain data within the repository may be imbalanced. For example, FIG. 6A shows an example of a data imbalance within a sample initial data set. Certain data within the case management repository may include anomalies. FIG. 6B shows an example of data anomalies within a sample initial data set.

Because one of the goals of the customer operation is to predict high effort experiences, it is desirable to validate any imbalances in the customer effort data contained within the case management repository. In certain embodiments, the high effort experiences correspond to cases which have a customer effort variable of a predetermined value (e.g., a StellaRating of 1-3).

Also, it is desirable to determine whether the customer effort data contained within the case management repository includes incomplete data that may require attention from the customer service interaction estimation operation. This determination may include reviewing the completeness of the dataset in terms of populated cells vs. gaps in important information. Data anomalies are an indication that the customer effort data contained within the case management repository may include incomplete data.

Figures 7, 8:
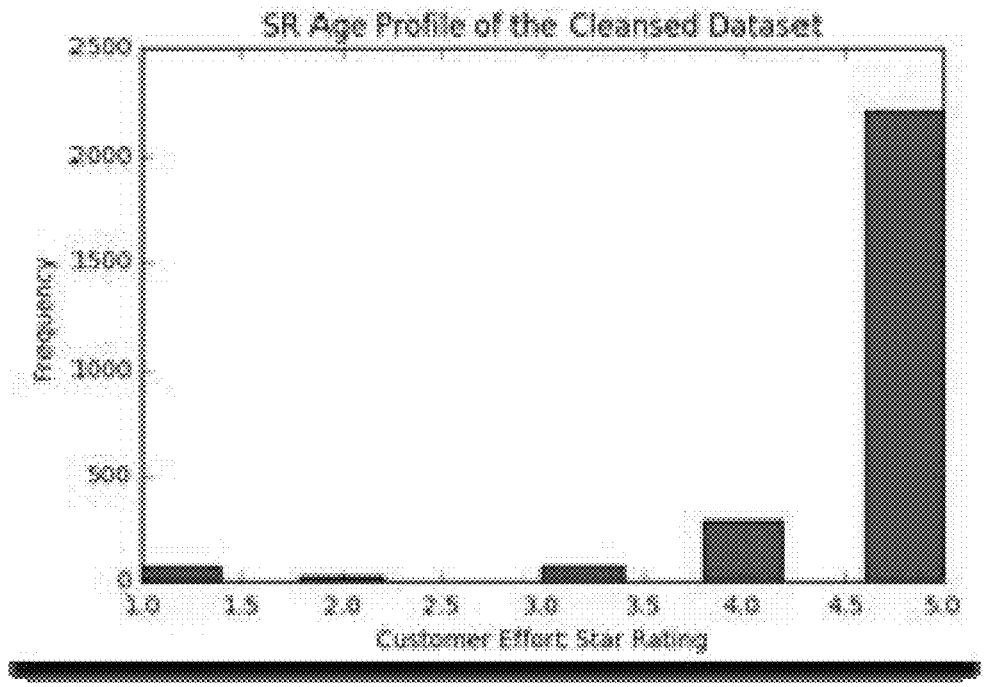
FIG. 7 shows an example result from a cleansing operation.
FIG. 8 shows chart of a distribution of customer effort from the cleansed data.

Next, data in the case management repository is cleansed. Specifically, for some of the data within the dataset, it is possible to ignore all cases that are missing data associated with important features. Also, there are some categorical features that are of low probative value when performing the customer service interaction estimation operation. For example, in certain instances, the case manager location and certain diagnostic tiers are not necessarily helpful when performing the machine learning operation. Thus, even if these variables are missing from certain entries in the dataset, the entries still provide useful information. FIG. 7 shows an example result from a cleansing operation. This example result shows a reconfirmation of data imbalance in the cleansed data. FIG. 8 shows a chart of a distribution of customer effort from the cleansed data. Note that the last column from this dataset, "Result," provides a target result (e.g., whether an individual (e.g., a case manager) receives a star rating of 1 through 5). FIG. 9 shows a chart of the distribution of service request age within the dataset.

Also, in certain embodiments, when cleansing the initial dataset a binary operation (e.g., a make_binary operation) is performed on the customer effort variable to create a binary problem from a multi class problem by merging some of the classes. For example, in certain embodiments, customer effort scores of 4 or 5 are assigned a 1 and customer effort scores of 1-3 are assigned a 0.

In various embodiments the machine learning operation evokes one or more strategies to mitigate risks associated with an imbalanced data set. More specifically, in various embodiments, the machine learning operation uses different machine learning algorithms. In various embodiments, the machine learning operation uses penalized models. In various embodiments, the machine learning operation resamples the dataset. In various embodiments the machine learning operation uses probability estimates vs. hard classification.

In certain embodiments, the machine learning operation uses a predictive machine learning operation to enable predictive outputs. In certain embodiments, the predictive machine learning operation includes an optimized decision tree classifier with class penalization.

A naïve predictor operation uses naïve Bayes classifiers. In machine learning, naïve Bayes classifiers are a family of probabilistic classifiers based on applying Bayes' theorem with strong (naïve) independence assumptions between the features. When a machine learning operation uses a naïve predictor operation to predict a likelihood of obtaining a desired performance level (e.g., grade of 4 or 5), it is desirable to determine the accuracy of the naïve predictor operation as well as the F-score, Kappa value and ROC performance on the dataset. For example, when performing a naïve predictor operation results of a machine learning operation for a test dataset are an accuracy score of 0.9424, an F-score of 0.9533 and a Kappa score of 0.000. A Kappa score provides is a measure of how closely the instances classified by a machine learning classifier match the data labeled as ground truth, controlling for the accuracy of a random classifier as measured by the expected accuracy. A low Kappa score (e.g., a Kappa score of 0) indicates poor performance of the machine learning classifier.

In certain embodiments, the machine learning operation uses one of a decision tree supervised learning operation, a logistic regression supervised learning operation and a random forest supervised learning operation. FIG. 10 shows example code for performing supervised learning models. A decision tree supervised learning operation uses a decision tree as a predictive model to proceed from observations about an item to conclusions about an item's target value. A logistic regression supervised learning operation uses a regression model where a dependent variable is categorical. In certain embodiments, the dependent variable is a binary dependent variable. A random forest supervised learning operation constructs a plurality of decision trees at training generates a class that is a mode of classes and mean prediction of individual trees.

Figure 11:
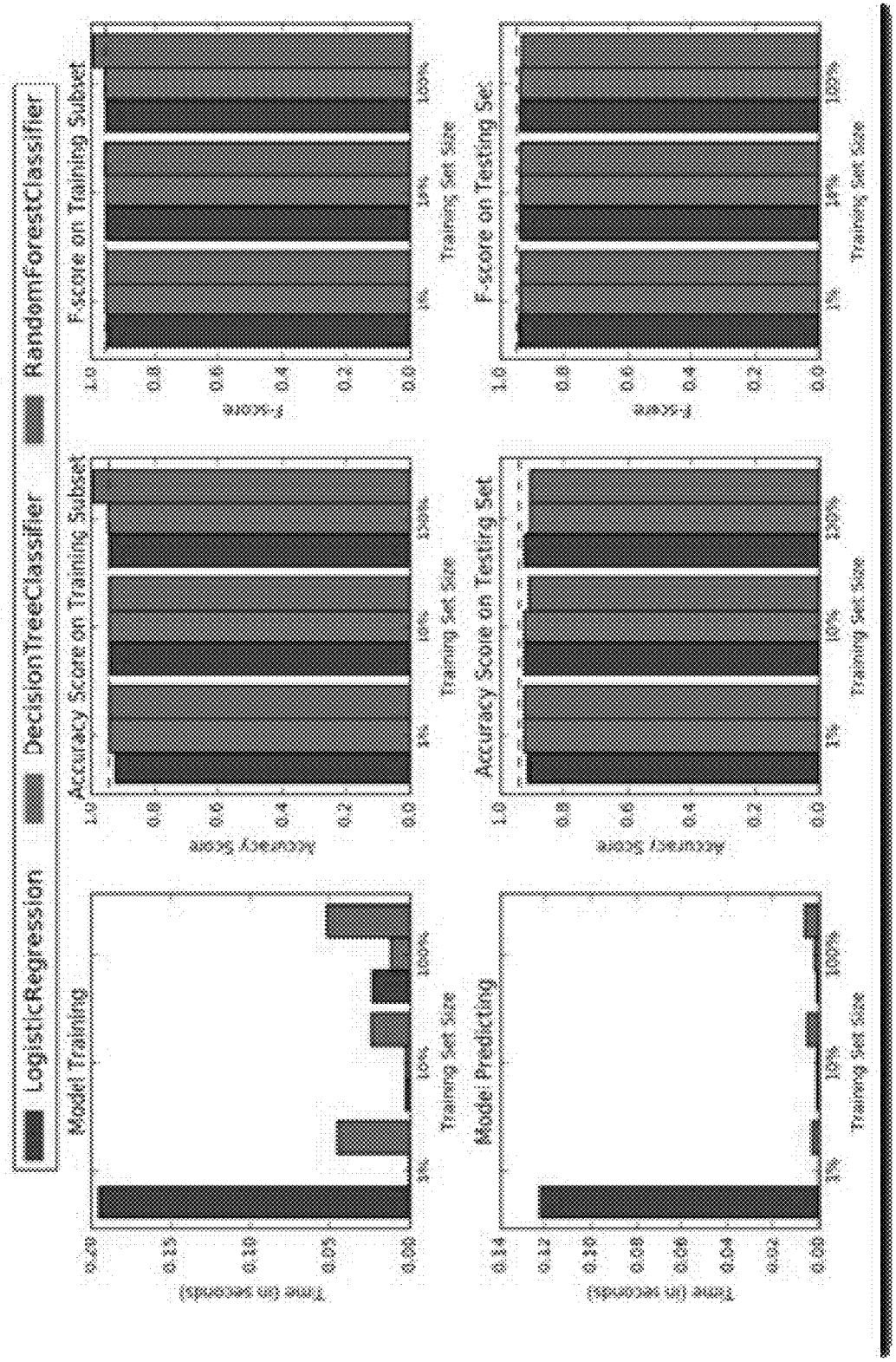
FIG. 11 shows example of performance metrics of the decision tree supervised learning operation, the logistic regression supervised learning operation and the random forest supervised learning operation.

FIG. 11 shows example of performance metrics of the decision tree supervised learning operation, the logistic regression supervised learning operation and the random forest supervised learning operation. FIG. 12 shows example results for the decision tree supervised learning operation, the logistic regression supervised learning operation and the random forest supervised learning operation. From the performance metrics and sample results it can be determined that the decision tree classifier performs best out of the three options in terms of overall accuracy based on blended accuracy and kappa scores. However, even the decision tree classifier has a relatively low Kappa score. With the decision tree classifier, the relatively low Kappa score can be attributed, at least in part, to the imbalance in the dataset.

In certain embodiments, when performing the machine learning operation the dataset is resampled. An advantage of resampling the dataset is that such an operation requires minor changes to the processing steps of the machine learning operation. Rather, resampling the dataset involves adjusting example datasets until the datasets are balanced. In various embodiments, resampling the dataset includes oversampling and under sampling. Oversampling randomly replicates minority instances to increase their population while under sampling randomly down samples the minority class.

However, when resampling the dataset, it is important to appreciate that replicating data is not without consequence as the process results in duplicate data. Thus the process can cause variable to appear to have a lower variance than they actually have. However, the process can also produce a positive result of duplicate a number of errors. For example, if a classifier makes a false negative error on the original minority data set and that dataset is replicated five times, the classifier will make six errors in the resampled dataset. Conversely, under sampling can cause independent variables to appear the have a higher variance than they actually have.

In one example dataset, there are 152 entries associated with a minority class and 2400 entries associated with a majority class. By using oversampling to randomly replicate minority instances, the population of minority class entries is increased to 462 entries, thus achieving a balanced dataset.

Figure 13:
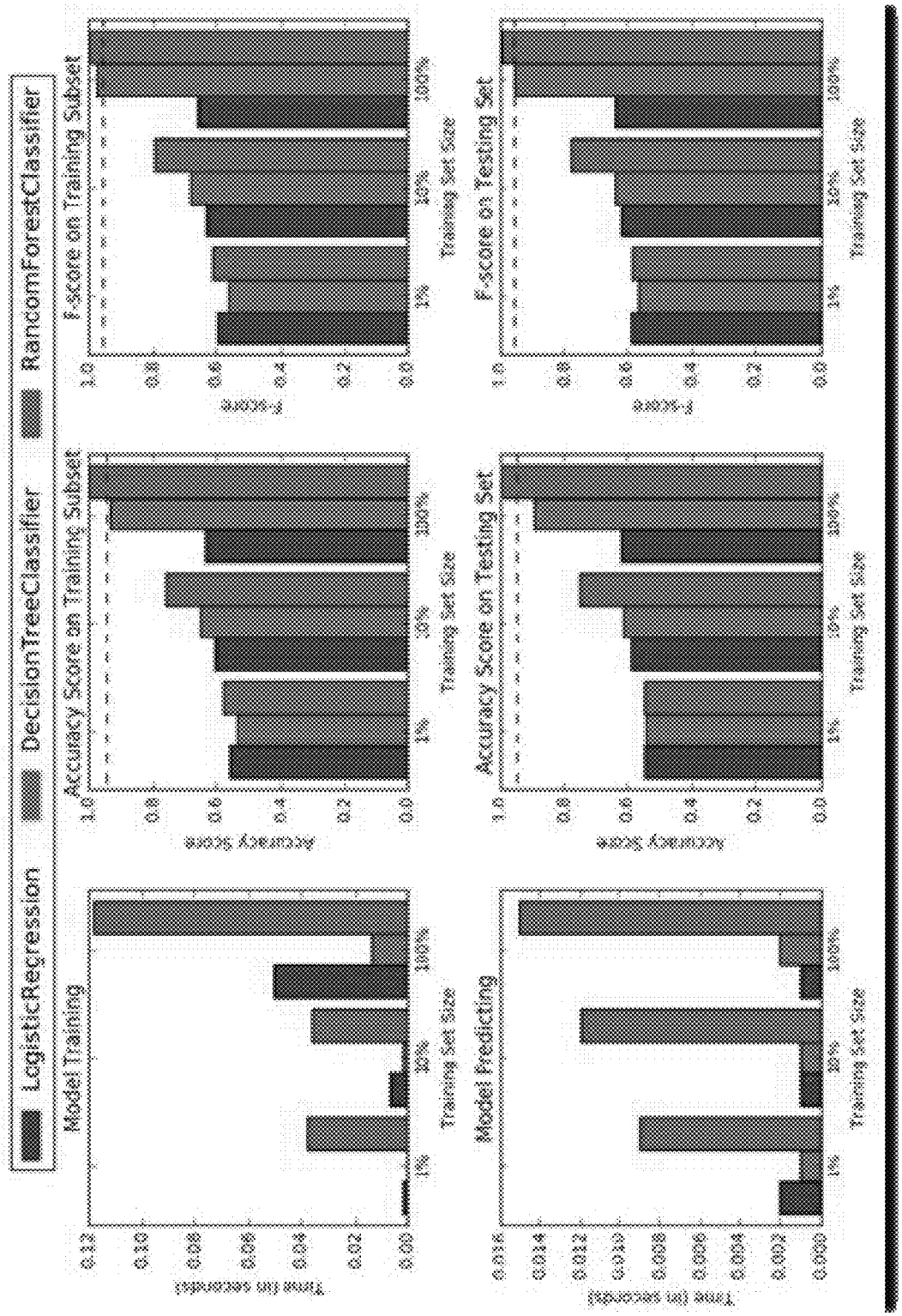
FIG. 13 shows example of performance metrics of the decision tree supervised learning operation, the logistic regression supervised learning operation and the random forest supervised learning operation for an oversampled dataset.

FIG. 13 shows example of performance metrics of the decision tree supervised learning operation, the logistic regression supervised learning operation and the random forest supervised learning operation for an oversampled dataset. FIG. 14 shows example results for the decision tree supervised learning operation, the logistic regression supervised learning operation and the random forest supervised learning operation for an oversampled dataset. From the performance metrics and sample results it can be determined that the Random Forest classifier performs best out of the three in terms of overall accuracy based on blended accuracy and Kappa scores. However, the Random Forest model can does take quite a long time to run (see e.g., left most chart in FIG. 13). Run time can be important consideration with operationalizing the model. Run time is roughly equivalent to computational cost. In light of this computational cost, in certain embodiments, the decision tree classifier is selected to be used for the next step in the refinement of the model (e.g., the GridSearch tuning).

In certain embodiments, a decision tree machine learning model may be fine-tuned via a grid search operation (GridSearchCV) to provide more accurate results. In certain embodiments, the grid search operation implements a fit and a score method where the parameters of the estimator used to apply these methods are optimized by cross-validated grid-search over a parameter grid. It will be appreciated that GridSearchCV is a module within a Python sciket learn environment used to fine tune machine learning models. In certain embodiments, important parameters of the decision tree machine learning operation are tuned using a plurality (e.g. 3) different values. In certain embodiments, the important parameters include a criterion parameter (criterion), a maximum depth parameter (max_depth), a minimum samples split parameter (min_samples_split), a minimum samples leaf parameter (min_samples_leaf), and a maximum leaf node parameter (max_leaf_notes). It will be appreciated that cross-validation provides a method for robustly estimating test-set performance of a model and a grid search operation facilitates selection of a best of a family of models, parametrized by a grid of parameters.

More specifically, the criterion parameter provides a function to measure the quality of a split. Supported criteria are "gini" for the Gini impurity and "entropy" for the information gain. The criterion parameter includes a string variable, an optional variable. The default value of the criterion parameter is "gini." The maximum depth parameter provides information regarding a maximum depth of the tree. If None, then nodes are expanded until all leaves are pure or until all leave contain less than a minimum samples split number of samples. The maximum depth parameter includes an int or None variable and an optional variable. The default value is None. The minimum samples split parameter provides information regarding a minimum number of samples required to split an internal node. If "int," then the minimum samples split value is considered as the minimum number. If "float," then the minimum samples split value is a percentage and "ceil(min_samples_split*N_samples) are the minimum number of samples for each node. The minimum samples split parameter includes an int variable, a float variable and an optional variable. The default value is 2. The minimum samples leaf parameter provides information regarding a minimum number of samples required to be at a leaf node. If "int," then the minimum samples leaf value is considered as the minimum number. If "float," then the minimum samples leaf value is a percentage and "ceil (min_samples_leaf*N_samples) are the minimum number of samples for each node. The minimum samples leaf parameter includes an int variable, a float variable and an optional variable. The default value is 1. The maximum leaf nodes parameter grows a tree with max_leaf_nodes in a best-first fashion. Best nodes are defined as relative reduction in impurity. If None, then the tree can grow to an unlimited number of nodes. The maximum leaf nodes includes an int or None variable and an optional variable. The default value is None.

When analyzing the various machine learning operations it is important to determine prediction performance vs. new test sets for each of the machine learning models. With the present disclosure it is desirable to identify machine learning operations which provide accurate information regarding predictions associated with a high customer effort which is indicative of a negative customer experience. These predictions, from a classification and probability perspective, are compared to actual effort scores for the associated case.

Evaluating the machine learning operations in a real world scenario (as compared with a test scenario) can be complicated due to the lack of feedback from a large number of customers. Typically, the response rates for customer feedback are in the 30-40% range. A preferred machine learning model should predict which real cases are likely to be a high effort experience. When comparing predictions with actual feedback to see how the model performed it is important to take into account false negatives (i.e., classifying a case as high effort when it is not).

With a sample dataset of 3292 open cases, the various machine learning operations that predict high effort cases along with a probability cut off assigned to class 0 type open case to avoid false negatives are as follows. For an initial model decision tree imbalanced training/testing dataset the machine learning operation predicted five high effort cases at 0.6 probability of class 0 where the matching vs. actual cases was not applicable. For a resampled model decision tree imbalanced training/testing data set the machine learning operation predicted 195 high effort cases at 1 probability of class 0 where the matching vs. actual cases was 17%. For an optimized model decision tree imbalanced training/testing data set the machine learning operation predicted 174 high effort cases at 1 probability of class 0 where the matching vs. actual cases was 35%.

In certain embodiments, the customer service interaction estimation operation can add a time series element into the predicted outcome. Specifically, as cases are not necessarily closed at the same time as changes occur in real time, the prediction could change. For example, with a particular test dataset for cases that were closed on a first date (e.g., July $17^{th}$) the percent score of match in predicted vs. actual effort scores was 38%, for cases that were closed on a next date (e.g., July $18^{th}$) the percent score was 44%, for cases that were closed on a next subsequent date (e.g., July $19^{th}$) the percent score was 8%, and for cases that were closed on or after a next subsequent date (e.g., July $20^{th}$) the percent score was 17%. As the Customer does not necessarily share their effort score until after the case is closed, which could be X days after a first prediction, some sort of blending/averaging of the predictions over the time series can be helpful.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Python, Java, Smalltalk, C++ or the like. However, the computer program code for carrying out operations of the present invention may also be written in conventional procedural programming languages, such as the "C" programming language or 'R' and similar programming languages. The operations of the present invention can also be implemented using software packages such as SAS, IBM Watson or software packages which support Machine Learning algorithms. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method for performing a customer service interaction estimation operation, comprising:
   training a customer service interaction estimation system using a training dataset of cases to provide a trained predictive model;
   identifying current open cases via the customer service interaction system;
   applying the trained predictive model to the current open cases to identify low customer experience (CE) cases;
   generating an estimation output relating to the current open cases, the estimation output identifying an open case subset of cases having a high risk of high effort to resolve, the estimation output being used to generate an overall customer effort variable, the overall customer effort variable representing a customer effort score, the customer effort score comprising a numerical value representing a respective customer effort; and,
   resampling the training dataset when training the customer service interaction system, the resampling comprising oversampling and undersampling, the oversampling randomly replicating minority instances to increase a population of minority instances, the undersampling randomly down sampling a minority class.

2. The method of claim 1, further comprising:
   providing the estimation output to a customer relationship management system; and,
   performing preemptive corrective actions on the open case subset.

3. The method of claim 1, wherein:
   the training, applying and generating implement machine learning operations to generate the estimation output.

4. The method of claim 3, wherein:
   the machine learning operations comprise a decision tree machine learning model.

5. The method of claim 1, wherein:
   the training comprises using oversampling to randomly replicate minority instances.

6. The method of claim 1, wherein:
   the current open cases are identified from a live pool of active customer service cases.

7. A system comprising:
   a processor;
   a data bus coupled to the processor; and
   a non-transitory, computer-readable storage medium embodying computer program code, the non-transitory, computer-readable storage medium being coupled to the data bus, the computer program code interacting with a plurality of computer operations and comprising instructions executable by the processor and configured for:
   training a customer service interaction estimation system using a training dataset of cases to provide a trained predictive model;
   identifying current open cases via the customer service interaction system;
   applying the trained predictive model to the current open cases to identify low customer experience (CE) cases;
   generating an estimation output relating to the current open cases, the estimation output identifying an open case subset of cases having a high risk of high effort to resolve, the estimation output being used to generate an overall customer effort variable, the overall customer effort variable representing a customer effort score, the customer effort score comprising a numerical value representing a respective customer effort; and,
   resampling the training dataset when training the customer service interaction system, the resampling comprising oversampling and undersampling, the oversampling randomly replicating minority instances to increase a population of minority instances, the undersampling randomly down sampling a minority class.

8. The system of claim 7, wherein the instructions executable by the processor are further configured for:
   providing the estimation output to a customer relationship management system; and,
   performing preemptive corrective actions on the open case subset.

9. The system of claim 7, wherein:
   the training, applying and generating implement machine learning operations to generate the estimation output.

10. The system of claim 9, wherein:
    the machine learning operations comprise a decision tree machine learning model.

11. The system of claim 7, wherein:
    the training comprises using oversampling to randomly replicate minority instances.

12. The system of claim 7, wherein:
the current open cases are identified from a live pool of active customer service cases.

13. A non-transitory, computer-readable storage medium embodying computer program code, the computer program code comprising computer executable instructions configured for:
training a customer service interaction estimation system using a training dataset of cases to provide a trained predictive model;
identifying current open cases via the customer service interaction system;
applying the trained predictive model to the current open cases to identify low customer experience (CE) cases;
generating an estimation output relating to the current open cases, the estimation output identifying an open case subset of cases having a high risk of high effort to resolve, the estimation output being used to generate an overall customer effort variable, the overall customer effort variable representing a customer effort score, the customer effort score comprising a numerical value representing a respective customer effort; and,
resampling the training dataset when training the customer service interaction system, the resampling comprising oversampling and undersampling, the oversampling randomly replicating minority instances to increase a population of minority instances, the undersampling randomly down sampling a minority class.

14. The non-transitory, computer-readable storage medium of claim 13, wherein the computer executable instructions are further configured for:
providing the estimation output to a customer relationship management system; and,
performing preemptive corrective actions on the open case subset.

15. The non-transitory, computer-readable storage medium of claim 13, wherein:
the training, applying and generating implement machine learning operations to generate the estimation output.

16. The non-transitory, computer-readable storage medium of claim 15, wherein:
the machine learning operations comprise a decision tree machine learning model.

17. The non-transitory, computer-readable storage medium of claim 13, wherein:
the training comprises using oversampling to randomly replicate minority instances.

18. The non-transitory, computer-readable storage medium of claim 13, wherein:
the current open cases are identified from a live pool of active customer service cases.

19. The non-transitory, computer-readable storage medium of claim 13, wherein:
the computer executable instructions are deployable to a client system from a server system at a remote location.

20. The non-transitory, computer-readable storage medium of claim 13, wherein:
the computer executable instructions are provided by a service provider to a user on an on-demand basis.

* * * * *